United States Patent
Kanao

[11] Patent Number: 5,429,397
[45] Date of Patent: Jul. 4, 1995

[54] CORRUGATED PIPE WITH JOINT AND METHOD OF FORMING THE LATTER ON THE FORMER

[76] Inventor: Shiro Kanao, No. 9-18, Nanpeidai 4-chome, Takatsuki-shi, Osaka, Japan

[21] Appl. No.: 733,775

[22] Filed: Jul. 22, 1991

[30] Foreign Application Priority Data

Jul. 26, 1990 [JP] Japan .................. 2-199916

[51] Int. Cl.[6] .............................. F16L 47/00
[52] U.S. Cl. ......................... 285/288; 285/368; 285/412; 285/903; 285/291; 138/121; 138/109; 264/271.1; 264/259
[58] Field of Search ............ 285/368, 367, 410, 288, 285/291, 903, 412, 292; 138/109, 121, 122, 923, 919; 264/271.1, 259, 274; 526/283

[56] References Cited

U.S. PATENT DOCUMENTS

| | | | |
|---|---|---|---|
| 801,774 | 10/1905 | Devonshire | 285/288 |
| 1,967,467 | 7/1934 | Damsel | 285/288 |
| 2,788,993 | 4/1957 | Oldham | 285/334.2 X |
| 3,314,039 | 4/1967 | Opper | 285/7 X |
| 3,565,464 | 2/1971 | Wolf | 285/7 |
| 4,152,014 | 5/1979 | Soeffker | 285/903 X |
| 4,415,389 | 11/1983 | Medford et al. | 138/122 X |
| 4,481,344 | 11/1984 | Newburg | 526/283 |
| 4,527,818 | 7/1985 | Rundell | 285/367 X |
| 4,724,111 | 2/1988 | Iwata et al. | 264/274 X |
| 4,786,697 | 11/1988 | Cozewith et al. | 525/236 x |
| 4,806,581 | 2/1989 | Walker | 525/263 X |
| 4,900,063 | 2/1990 | Baarfüsser et al. | 283/367 X |
| 4,998,317 | 3/1991 | Passien | 285/7 X |
| 5,102,589 | 4/1992 | Chono et al. | 426/283 X |

FOREIGN PATENT DOCUMENTS

| | | | |
|---|---|---|---|
| 0870347 | 3/1953 | Germany | 285/367 |
| 63-112126 | 5/1988 | Japan . | |

*Primary Examiner*—Randolph A. Reese
*Assistant Examiner*—Heather Chun Shackelford
*Attorney, Agent, or Firm*—Sughrue, Mion, Zinn, Macpeak & Seas

[57] ABSTRACT

A corrugated pipe has a solid joint which is formed fixedly on an end portion of the pipe by polymerization and solidification of a reaction solution which polymerizes quickly at room temperature in such a manner that the joint has a first cylindrical portion which has a first predetermined length from the end of the pipe in the axial direction, or the first cylindrical portion and a second cylindrical portion which is elongated axially outwardly from the first cylindrical portion to a second predetermined length. The first or second cylindrical portion has a locking mechanism such as an annular groove or flange which is so formed as to detachably connect the joint to the joint (H) of another mating corrugated pipe.

10 Claims, 5 Drawing Sheets

CORRUGATED PIPE WITH JOINT AND METHOD OF FORMING THE LATTER ON THE FORMER

BACKGROUND OF THE INVENTION

This invention relates to a corrugated pipe with a joint at the end, and a method of forming the joint on an end of the corrugated pipe. The term "corrugated pipe" as used herein is intended to mean both a spirally corrugated pipe—the parallel, alternate ridges and grooves of the wall are spiral, and an annularly corrugated pipe—the parallel, alternate ridges and grooves of the wall are annular.

An injection molding method is well known in the art in which a liquid-phase monomer, such as a norbornene (phonetic) type monomer, which is quickly polymerized and solidified at room temperature (without heating it) is injected into metal molds at a high temperature, for instance about 90° C., under a high pressure, for instance about 3 to 40 kg/cm², to form a variety of moldings (cf. Japanese Patent Application (OPI) No. 112126/1988 (the term "OPI" as used herein means an "unexamined published application").

On the other hand, a variety of pipe joints are available which are formed in addition to pipes.

It is not always simple to mold a pipe joint for a large diameter corrugated pipe, for instance 1000 mm to 2000 mm in inside diameter, by the above-described injection molding method, because the metal mold is necessarily bulky and the molding may suffer from settling or shrinkage. Furthermore, practicing the injection molding method is accompanied by high temperature and high pressure, and needs a pressure maintaining process after injection molding as is disclosed by the aforementioned Japanese Patent Application. Thus, the method suffers from a problem that the attached facilities are intricate in addition to the problem that the molding machine is bulky. Furthermore, because of the pressure maintaining process, it is impossible to increase the molding efficiency.

On the other hand, in the case where the reinforcing rib of a large diameter pipe buried in the ground is spiral, it is considerably difficult to screw the end portion of the large diameter pipe into a large joint formed as one separate component.

SUMMARY OF THE INVENTION

Accordingly, an object of this invention is to eliminate the above-described difficulties accompanying a conventional method of forming a joint for a corrugated pipe.

More specifically, an object of the invention is to provide a method of forming a joint on an end portion of a corrugated pipe with ease by using a reaction solution prepared by mixing a catalyst and an activator with a monomer of the type that polymerization is effected quickly at room temperature (hereinafter referred to as a "room temperature quick polymerization type monomer", when applicable) such as the above-described norbornene type monomer, being different from the conventional injection molding method requiring a precise metal mold which is durable against high temperature and high pressure; and to provide a corrugated pipe with a joint on its end portion which is formed by using the monomer.

The foregoing object and other objects of the invention have been achieved by the provision of:

a corrugated pipe which, according to the invention, has a solid joint (H) formed fixedly on an end portion of the pipe by polymerization and solidification of a reaction solution of a room temperature quick polymerization type in such a manner that the joint (H) has a cylindrical barrel portion (H1) which has a first predetermined length (h1) from the end of the pipe in the axial direction of the pipe, surrounding the end portion of the pipe completely, or the cylindrical barrel portion (H1) and an elongated short cylindrical portion (H2) which is elongated axially outwardly from the cylindrical barrel portion (H1) to a second predetermined length (h2), the joint (H) being integral with the outer wall of the end portion of the pipe and larger in diameter than the pipe (4), the cylindrical barrel portion (H1) or the elongated short cylindrical portion (H2) having locking means (8) which is so formed as to detachably connect the joint (H) to the joint (H) of another mating corrugated pipe; and a method of integrally forming a joint (H) on a corrugated pipe (4), in which the corrugated pipe (4) is engaged with a plug member (1) comprising a bottom plate (3) and a protrusion (2) extended from one surface of the bottom plate in such a manner that an end portion of the corrugated pipe is coaxially put on the protrusion, cylindrical frames (5 and 5) of a two-piece divided type which, when combined together, have an inside diameter larger than the outside diameter of the corrugated pipe (4) and a circumferential length large enough to embrace the corrugated pipe (4) and each of which has a forming portion (5d) on the inner wall which is used to form joint locking means (8) are mounted on the bottom plate (3) of the plug member (1) in such a manner that the cylindrical frames (5 and 5) combined are coaxial with the corrugated pipe (4), thereafter, a reaction solution (M) which will quickly polymerize and solidify at room temperature is injected into the space (S) between the outer wall of the corrugated pipe (4) and the inner wall (5c) of the cylindrical frames (5 and 5), and after the reaction solution (M) thus injected, being polymerized and solidified, is formed into the joint (H) in such a manner that the joint (H) thus formed is integral with the outer wall of the corrugated pipe (4), the cylindrical frames (5 and 5) are removed from the bottom plate (3) of the plug member (1), and the plug member (1) is removed from the end portion of the corrugated pipe (4), whereby the joint (H) is fixedly formed on the end portion of the corrugated pipe (4) (cf FIG. 2).

The protrusion (2) of the plug member (1), which is tapered, is fitted in the end portion of the corrugated pipe (4). The cylindrical frames (5 and 5) are mounted on the bottom plate 3 of the plug member (1) in such a manner as to form a space (S) between the outer wall of the reinforcing ribs (4a) of the pipe (4) and the inner wall of the cylindrical frames (5 and 5) (cf. FIG. 2). The reaction solution (M) is injected into the space (S) from above at a predetermined flow rate. After the reaction solution has been solidified into the joint (H), the frames and the plug member are removed from the corrugated pipe.

The nature, principle and utility of the invention will become more apparent from the following detailed description when read in conjunction with the accompanying drawings.

BRIEF DESCRIPTION OF THE DRAWINGS

In the accompanying drawings:

More specifically, FIG. 1 is an exploded perspective view showing a corrugated pipe, cylindrical frames and a plug member in the embodiment;

FIG. 2 is a vertical sectional view showing the corrugated pipe, the cylindrical frames and the plug member which are assembled together;

FIG. 3 is also a vertical section view for a description/of the injection of a reaction solution;

FIG. 4 is a side view, partly as a sectional view, for a description of the connection of two corrugated pipes on which the joints are formed according to the invention;

FIG. 5 is a sectional side view showing the two corrugated pipes which have been connected to each other;

More specifically, FIG. 7 is a vertical sectional view showing a corrugated pipe, cylindrical frames and a plug member with the reaction solution injected into the space between the pipe and the frames in the second embodiment;

FIG. 8 is a side view showing the connection of two corrugated pipes on which joints are formed as shown in FIG. 7.

DETAILED DESCRIPTION OF THE PREFERRED EMBODIMENTS

Preferred embodiments of this invention will be described with reference to the accompanying drawings.

A first embodiment of the invention will be described with reference to FIGS. 1 through 6.

Figure 1:
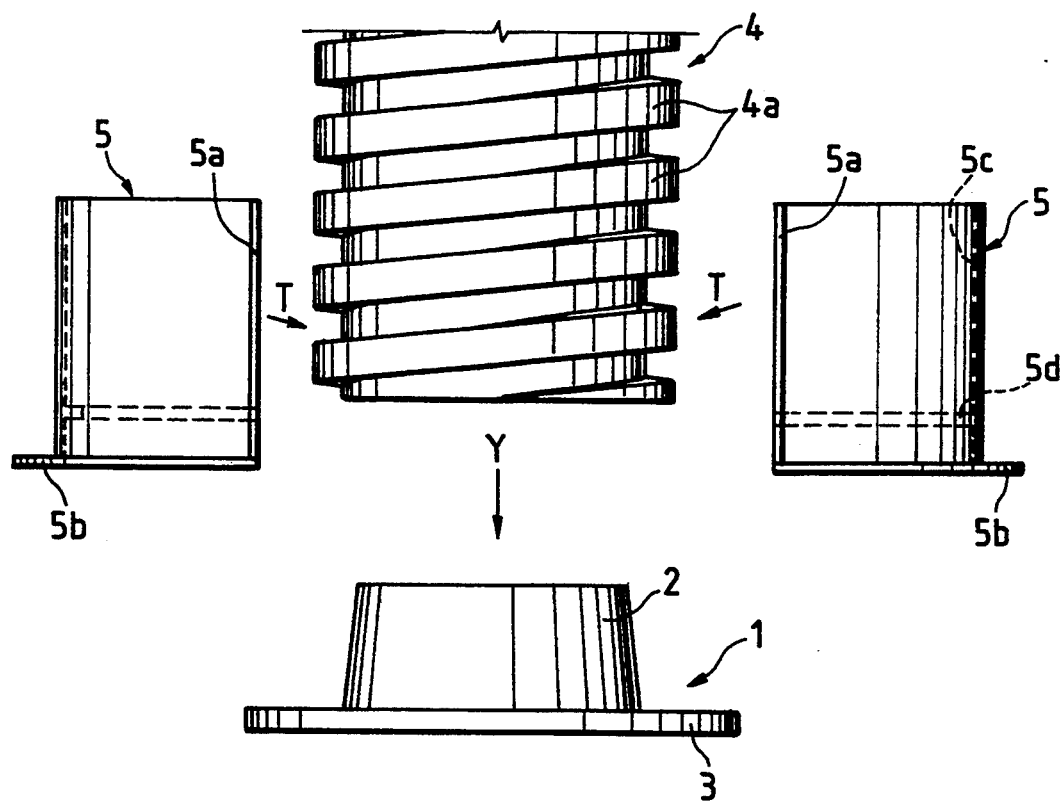
FIGS. 1 through 5 show a first embodiment of this invention.

As shown in FIG. 1, a plug member 1 comprising a bottom plate 3 and a protrusion 2 formed on the latter 3 is set with the protrusion 2 held at the top. A corrugated pipe 4 is engaged with the protrusion 2 which is tapered as shown in FIG. 1. That is, the front end portion of a corrugated pipe 4 is put on the protrusion 2 to the middle of the height of the latter 2. More specifically, the corrugated pipe 4 is moved in the direction of the arrow Y until it engages the protrusion 2 of the plug member 1 in such a manner that the inner wall of the end portion of the corrugated pipe 4 is in close contact with the outer wall of the tapered protrusion 2. That is, the corrugated pipe is erected on the plug member 1 as shown in FIG. 2, and two frames 5 and 5, each being in the form of a cylinder half which is obtained by vertically cutting a cylinder into two parts, are arranged as shown in FIG. 2 by moving them as indicated by the arrows T in FIG. 1.

Each of the frames 5 and 5 has abutting end portions 5a and 5a at both side edges extended axially, and a flange at the lower end. The abutting end portions 5a and 5a of one of the frames 5 are abutted against those 5a and 5a of the other frame 5, and, when necessary, they are tightened together with screws 6. Thereafter, the flanges 5b and 5b of the frames 5 and 5 are secured to the bottom plate 3 of the plug member 1 with bolts 7.

Figure 2:
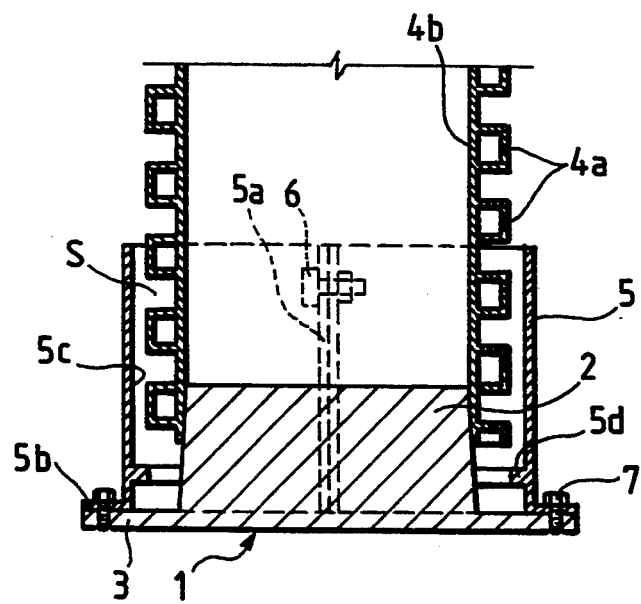
Figure 3:
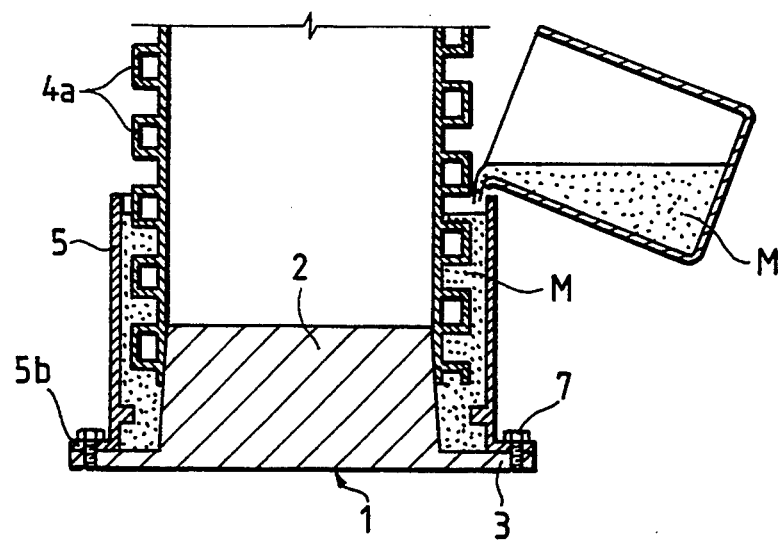

Thus, the frames 5 and 5 thus secured are coaxial with the corrugated pipe 4, and a predetermined space S is formed between the inner wall 5c of the frames 5 and the outer wall of the spiral reinforcing rib 4a of the corrugated pipe 4 as shown in FIG. 2. The frames 5 and 5 have a flange-shaped annular protrusion 5d slightly above the flanges 5b. I More specifically, the annular protrusion 5d is radially inwardly extended from the inner wall of the frames 5. The annular protrusion 5d is to form a locking means 8 for a joint H (described later).

Under this condition, a reaction solution M of a room temperature quick polymerization type which is agitated without being heated is poured into the space S from above. The solution pouring rate is preferably such that the contraction of the solution due to polymerization and solidification is automatically compensated for by the reaction solution which is poured succeedingly.

Figure 4:
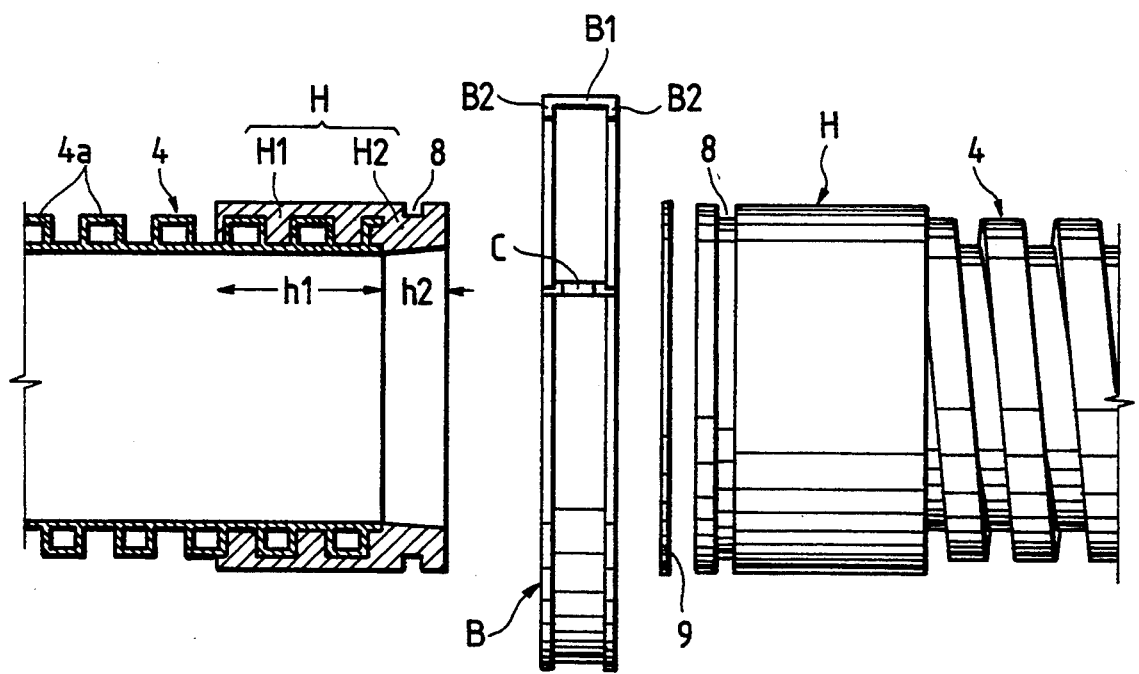

After the solution pouring operation is accomplished, the reaction solution thus poured is held still for a certain period (five or six minutes at room temperature), the frames 5 and 5 are removed from the plug member 1, and then the plug member 1 is disengaged from the end portion of the pipe. As a result, the aforementioned joint H is formed as shown in the left part of FIG. 4 in such a manner that it is fixedly secured to the entire outer wall of the end portion of the corrugated pipe 4. The right half of FIG. 4 shows another corrugated pipe 4 on which a joint H is formed in the same method. Each of the joints H has a cylindrical barrel portion H1 surrounding more than one reinforcing rib 4a, three reinforcing ribs 4a in FIG. 4, on the end portion of the corrugated pipe 4, and an elongated short cylindrical portion H2 shorter than the cylindrical portion H1 which is elongated from the cylindrical barrel portion H1 axially outwardly. The elongated cylindrical portion H2 has the aforementioned locking means 8, namely, an annular groove which is formed by the annular protrusion 5d of the frames 5 and 5.

The joint H consisting of the barrel portion H1 and the elongated short cylindrical portion H2 is in the form of a cylinder having no larger diameter portion as a whole, with the amount of protrusion h2 from the corrugated pipe 4 minimized.

Figure 5:
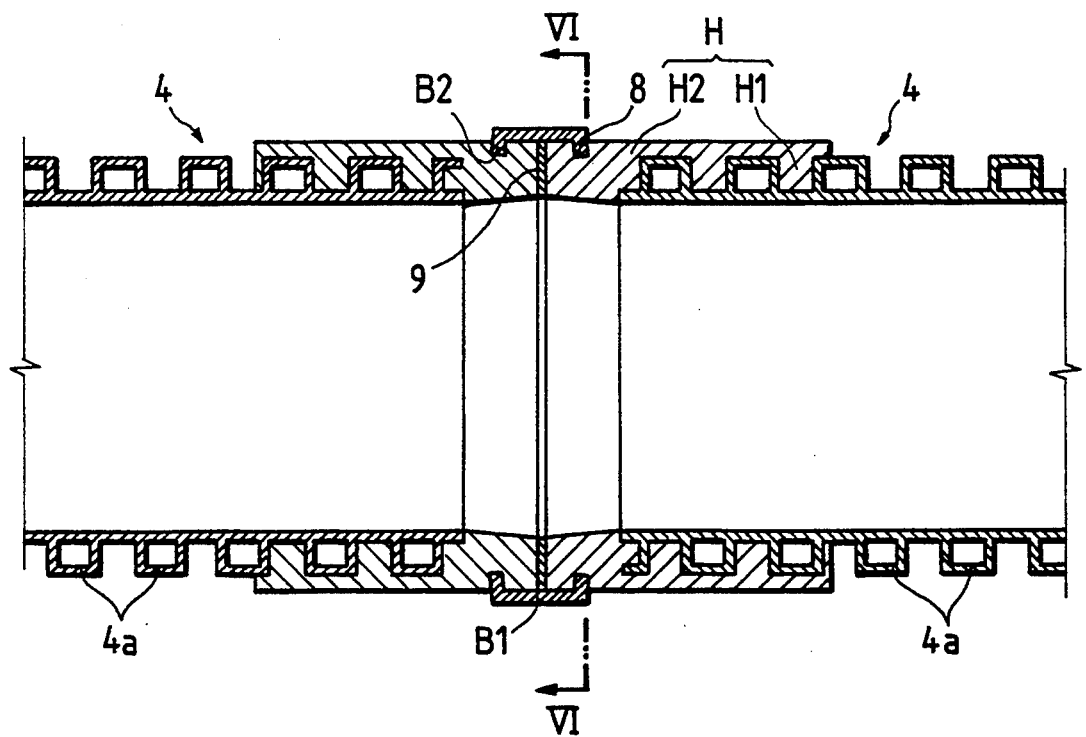
Figure 6:
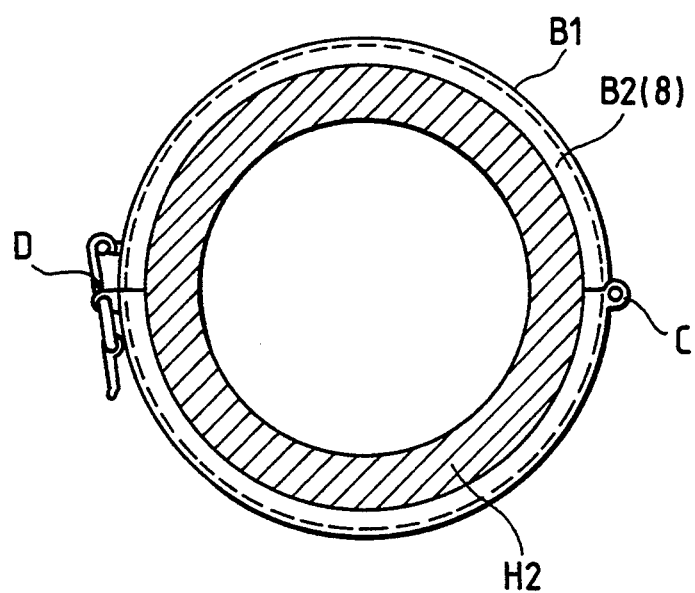
FIG. 6 is a cross sectional view taken along line VI—VI in FIG. 5.

A pair of corrugated pipes 4 and 4 with the joints H and H at the ends are joined liquid-tight through the joints H and H as shown in FIGS. 4 through 6.

First, an annular packing 9 is interposed between the end faces of the joints H and H. Then, the joints H and H are engaged with each other with a two-piece divided type binding metal belt B with a hinge C and a click type buckle D. Each of the two-pieces forming the binding metal belt B has an elongated arcuate belt B1 with bent portions B2 and B2 extended radially inwardly from two parallel edges thereof. With the hinge C opened, the bent portions B1 of the two-piece divided type metal belt B are inserted into the annular grooves 8 and 8 of the joints H and H, and then the metal belt B is tightened on the joints H and H with the click type buckle D. That is, the joints H and H on the end portions of the pipes 4 and 4 are detachably connected with the two-piece divided type binding metal belt B.

Figure 7:
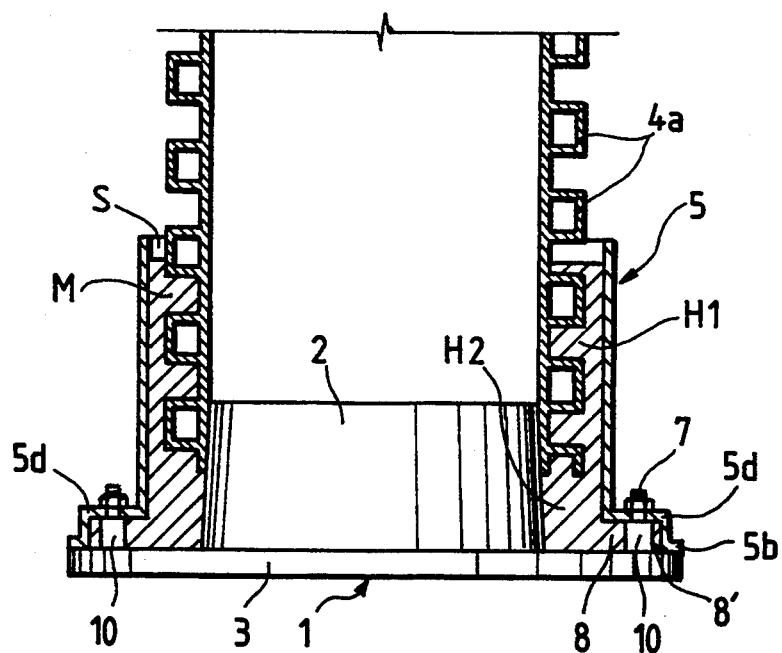
FIGS. 7 and 8 show a second embodiment of the invention.

A second embodiment of the invention will be described with reference to FIGS. 7 and 8. The second embodiment is different from the above-described first embodiment in that the joint H has no annular groove (8 in the first embodiment) and instead has a flange 8 which is extended radially outwardly from the outer end of the joint H.

In the second embodiment, each of the frames 5 and 5 includes a frame body and a flange 5b at the end, and a portion between the frame body and the flange 5b which portion is bent in such a manner that it is protruded radially outwardly so as to serve as an annular flange forming portion 5d. On the other hand, a plurality of small cylindrical spacers 10 having threaded end portions are formed on the bottom plate of the plug member 1 at predetermined angular intervals in such a manner that they are protruded axially upwardly to confront with the annular flange forming portion. Nuts 7 are engaged with the threaded end portions of the spacers 10 through the annular flange forming portions 5d of the frames 5 and 5 until the latter 5 and 5 are fixedly secured to the plug member 1.

With the frames thus arranged, a joint H can be formed which has a plurality of connecting bolt holes 8' in the flange 8 at the predetermined angular intervals.

Similarly as in the first embodiment, the above-described reaction solution M is poured into the space S between the corrugated pipe 4 and the frames 5, and the reaction solution M in the space S is polymerized and solidified. Thereafter, the frames 5 and the plug member 1 are removed from the corrugated pipe 4, as a result of which the joint H is formed on the corrugated pipe 4 which has the bolt holes 8' in the flange 8 in correspondence to the spacers 10.

Figure 8:
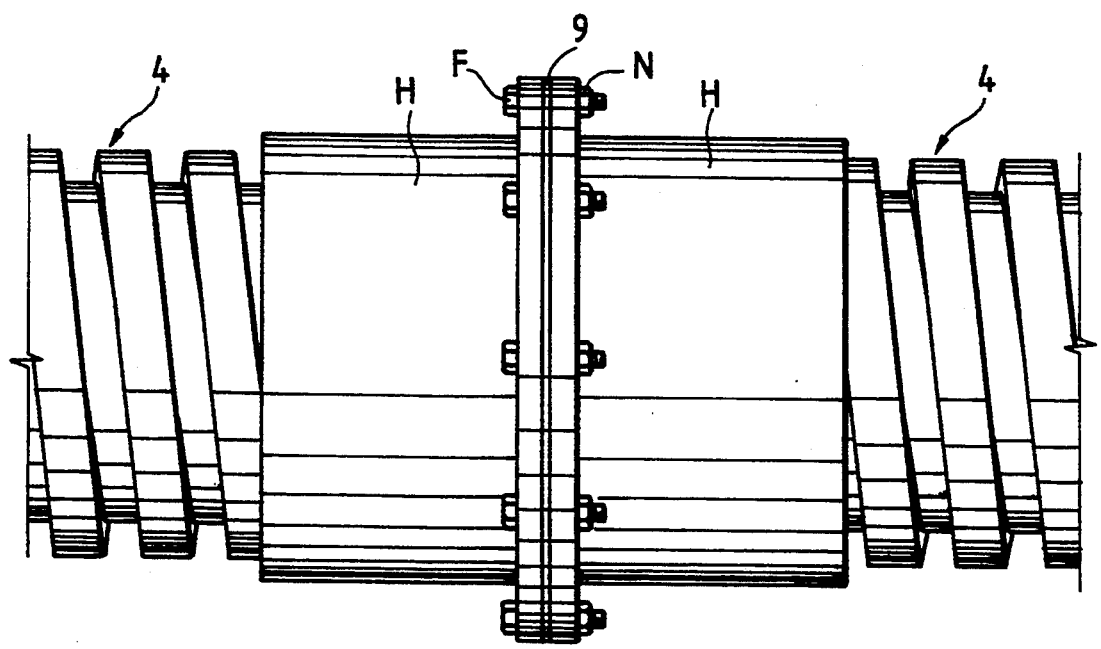

The joints H and H thus formed are connected as shown in FIG. 8. More specifically, the joints H and H are abutted against each other with a packing 9 disposed therebetween, in such a manner that the bolt holes 8' of one of the joints H are in alignment with those 8' of the other joint H. Under this condition, bolts F are inserted into the bolt holes 8' thus aligned, and tightened with nuts N.

It goes without saying that, in the second embodiment, a two-piece divided type binding metal belt similar to the one B employed in the first embodiment may be used to tighten the joints H and H together.

Figure 9:
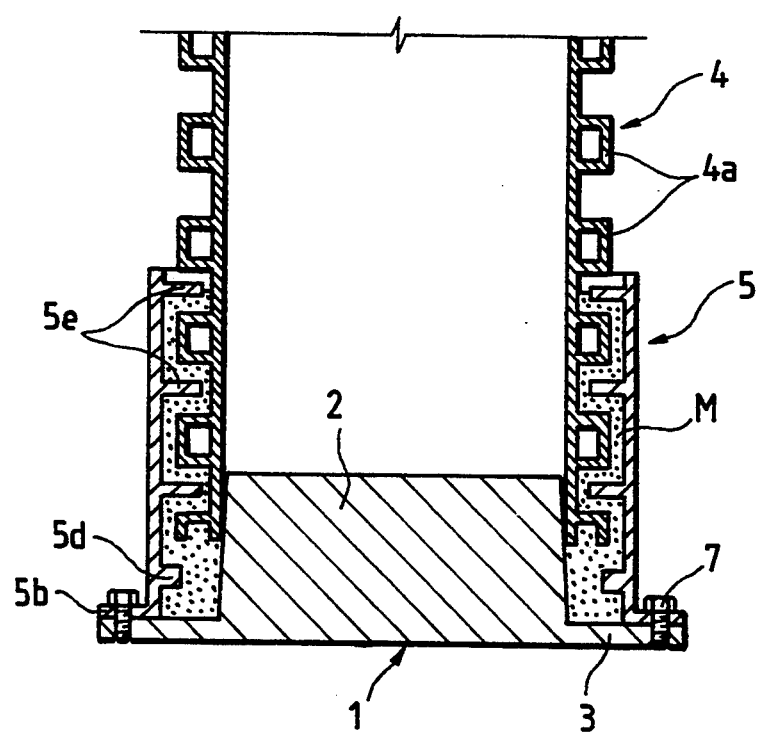
FIG. 9 is a vertical sectional view showing a third embodiment of the invention.

FIG. 9 shows a third embodiment of the invention. In the embodiment, the corrugated pipe 4 has annular reinforcing ribs 4a, and the frames 5 and 5 have a plurality of annular flanges 5e which are radially inwardly protruded from the inner wall thereof in such a manner that they are intertwined with the annular reinforcing ribs 4a. The reaction solution M is poured into the space between the corrugated pipe 4 and the frames 5 so as to form a joint H on the end portion of the corrugated pipe 4. The joint H thus formed has a plurality of annular grooves. In this case, the quantity of reaction solution required for the formation of the joint H is smaller by as much as the sum of the volumes of the flanges 5e of the frames 5 and 5 than in the first or second embodiment. This advantage is found also with a corrugated pipe which has spiral reinforcing ribs.

The norbornene (phonetic) type monomer, which is an example of the room temperature quick polymerization type monomer, may be dicyclopentadiene, tetracyclododecene (phonetic) or tricyclo-pentadiene. The polymerization catalyst may be a halogenide of tungsten, molybdenum or tantalum, or organic ammonium salts. The activator (co-catalyst) may be alkyl aluminum halide or organic tin compound.

By suitably determining the combination of these catalysts and co-catalysts and the quantities of them, the reaction solution can be quickly polymerized at room temperature. In view of various reasons, it is preferable to employ a two-liquid method in which a first liquid containing the above-described monomer and catalyst, and a second liquid containing the above-described monomer and co-catalyst are mixed immediately before use. The bulking agent, coloring pigment, antioxidant, elastomer such as rubber as macromolecule reforming agent, and polymerization speed adjusting agent may be suitably compounded as the case may be. The catalyst or co-catalyst is generally several tens of milli-moles with respect to the monomer.

On the other hand, the reaction solution may be of one-liquid type. In this case, the solution prepared by dissolving the co-catalyst in an inert solvent should be mixed with the reaction solution immediately before it is used.

While there has been described above the methods used and the products made in connection with the preferred embodiments of the invention, it will be obvious to those skilled in the art that various changes and modifications may be made therein without departing from the invention.

For instance, in the above-described embodiments, the joint is formed under the condition that the cut end of the corrugated pipe with the spiral reinforcing ribs is set slightly apart from the bottom plate of the plug member. However, the joint may be formed with the cut end of the corrugated pipe set directly on the bottom plate of the plug member. This may be applied also to the formation of a joint for a corrugated pipe having annular reinforcing ribs. In this case, the elongated short cylindrical portion is eliminated.

In the above-described embodiment, the joint is formed with the plug member, the corrugated pipe and the frames held vertical. However, the plug member, the corrugated pipe and the frames may be set horizontal. In this case, a sealing member is set between the corrugated pipe and the frames so as to close the space between them; i.e., to hold the reaction solution in the space, and a solution injection hole is formed in the barrel of one of the frames, through which the reaction solution is injected into the space to form the joint.

Furthermore in the above-described embodiment, the joint is formed on the outer wall of the corrugated pipe. However, the embodiment may be so modified that the reaction solution flows not only along the outer wall of the corrugated pipe but also along the inner wall to form a joint with the end portion of the corrugated pipe as a core.

As is apparent from the above description, according to the invention, in formation of the pipe joint on the end portion of the corrugated pipe, it is unnecessary to use such a large injection molding machine as is employed in the conventional method, nor to use an expensive precise metal mold which is durable against high temperature and high pressure, nor to employ a pressure maintaining process after injection and attached facilities. That is, according to the invention, the pipe joint can be readily formed on the end portion of a corrugated pipe using the simple frames. Furthermore, in the formation of the pipe joint, heating is unnecessary; that is, it can be formed at room temperature. The reaction solution being solidified quickly, the pipe joint can be formed with high efficiency.

The joint formed on the end portion of the pipe has the locking means which is used to connect itself to the mating joint. Therefore, the corrugated pipes with the joints according to the invention can be readily connected to one another at working sites.

While there has been described above the methods used and the products made in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A connection between a pair of axially aligned corrugated pipes, each pipe having an outer wall having parallel, alternate ridges and grooves, said connection comprising:
  a solid joint molded integrally over an end portion of said each pipe such that said joint is adhered to an entire outer surface of a portion of the alternate ridges and grooves with no gap being formed between said joint and said outer surface, said joint comprising a polymerized and solidified room-temperature quick polymerization-type reaction solution, and having a first cylindrical portion which has a first predetermined length from the end of said pipe in the axial direction of said pipe, said first cylindrical portion surrounding said end portion of said pipe completely; and
  locking means formed on said first cylindrical portion of each joint;
  wherein said reaction solution is prepared by mixing a polymerization catalyst and an activator with a norbornene-type monomer selected from a group consisting of dicyclopentadiene, tetracyclododecene and tricyclo-pentadiene, said polymerization catalyst being selected from a group consisting of organic ammonium salts and a halogenide of tungsten, molybdenum or tantalum, and said activator being selected from a group consisting of alkyl aluminum halide and organic tin compound;
  wherein said locking means include an annular groove formed on an entire outer circumferential surface of each said first cylindrical portion, and a circumferentially extending band clamp having radially inwardly extending bent portions at opposite axial ends thereof; and
  wherein said bent portions respectively engage the grooves of both joints to provide a connection between the aligned pipes.

2. The corrugated pipe as claimed in claim 1, wherein said reaction solution is poured.

3. A connection between a pair of axially aligned corrugated pipes, each pipe having an outer wall having parallel, alternate ridges and grooves, said connection comprising:
  a solid joint molded integrally over an end portion of said each pipe such that said joint is adhered to an entire outer surface of a portion of the alternate ridges and grooves with no gap being formed between said joint and said outer surface, said joint comprising a polymerized and solidified room-temperature quick polymerization-type reaction solution, and having a first cylindrical portion which has a first predetermined length from the end of said pipe in the axial direction of said pipe and a second cylindrical portion which is elongated axially outwardly from said first cylindrical portion to a second predetermined length, said second cylindrical portion surrounding said end portion of said pipe completely; and
  locking means formed on said second cylindrical portion of each joint;
  wherein said reaction solution is prepared by mixing a polymerization catalyst and an activator with a norbornene-type monomer selected from a group consisting of dicyclopentadiene, tetracyclododecene and tricyclo-pentadiene, said polymerization catalyst being selected from a group consisting of organic ammonium salts and a halogenide of tungsten, molybdenum or tantalum, and said activator being selected from a group consisting of alkyl aluminum halide and organic tin compound;
  wherein said locking means include an annular groove formed on an entire outer circumferential surface of each said second cylindrical portion, and a circumferentially extending band clamp having radially inwardly extending bent portions at opposite axial ends thereof; and
  wherein said bent portions respectively engage the grooves of both joints to provide a connection between the aligned pipes.

4. The corrugated pipe as claimed in claim 3, wherein said reaction solution is

5. A connection between a pair of axially aligned corrugates pipes, each pipe having an outer wall having parallel, alternate ridges and grooves, said connection comprising:
  a solid joint molded integrally over an end portion of said each pipe such that said joint is adhered to an entire outer surface of a portion of the alternate ridges and grooves with no gap being formed between said joint and said outer surface, said joint comprising a polymerized and solidified room-temperature quick polymerization-type reaction solution, and having a first cylindrical portion which has a first predetermined length from the end of said pipe in the axial direction of said pipe, said first cylindrical portion surrounding said end portion of said pipe completely; and
  locking means formed on said first cylindrical portion of each joint;
  wherein said reaction solution is prepared by mixing a polymerization catalyst and an activator with a norbornene-type monomer selected from a group consisting of dicyclopentadiene, tetracyclododecene and tricyclo-pentadiene, and wherein said reaction solution is poured;
  wherein said locking means include an annular groove formed on an entire outer circumferential surface of each said first cylindrical portion, and a circumferentially extending band clamp having radially inwardly extending bent portions at opposite axial ends thereof; and
  wherein said bent portions respectively engage the grooves of both joints to provide a connection between the aligned pipes.

6. A connection between a pair of axially aligned corrugated pipes, each pipe having an outer wall having parallel, alternate ridges and grooves, said connection comprising:
  a solid joint molded integrally over an end portion of said each pipe such that said joint is adhered to an entire outer surface of a portion of the alternate ridges and grooves with no gap being formed between said joint and said outer surface, said joint comprising a polymerized and solidified room-temperature quick polymerization-type reaction solution, and having a first cylindrical portion which has a first predetermined length from the end of said pipe in the axial direction of said pipe and a second cylindrical portion which is elongated axially outwardly from said first cylindrical portion to a second predetermined length, said second cylindrical portion surrounding said end portion of said pipe completely; and locking means formed on said second cylindrical portion of each joint;

wherein said reaction solution is prepared by mixing a polymerization catalyst and an activator with a norbornene-type monomer selected from a group consisting of dicyclopentadiene, tetracyclododecene and tricyclo-pentadiene, and wherein said reaction solution is poured;

wherein said locking means include an annular groove formed on an entire outer circumferential surface of each said second cylindrical portion, and a circumferentially extending band clamp having radially inwardly extending bent portions at opposite axial ends thereof; and wherein said bent portions respectively engage the grooves of both joints to provide a connection between the aligned pipes.

7. A connection between a pair of axially aligned corrugated pipes, each pipe having an outer wall having parallel, alternate ridges and grooves, said connection comprising:

a solid joint molded integrally over an end portion of said each pipe such that said joint is adhered to an entire outer surface of a portion of the alternate ridges and grooves with no gap being formed between said joint and said outer surface, said joint comprising a polymerized and solidified room-temperature quick polymerization-type reaction solution, and having a first cylindrical portion which has a first predetermined length from the end of said, pipe in the axial direction of said pipe, said first cylindrical portion surrounding said end portion of said pipe completely; and locking means formed on said first cylindrical portion of each joint;

wherein said reaction solution is prepared by mixing a polymerization catalyst and an activator with a norbornene-type monomer selected from a group consisting of dicyclopentadiene, tetracyclododecene and tricyclo-pentadiene, said polymerization catalyst being selected from a group consisting of organic ammonium salts and a halogenide of tungsten, molybdenum or tantalum, and said activator being selected from a group consisting of alkyl aluminum halide and organic tin compound; and wherein said locking means include:
an annular flange which is formed on an entire outer circumferential surface of each said first cylindrical portion and which extends radially outwardly from the outer end of said each first cylindrical portion, and means for fastening the annular flanges to each other to provide a connection between the aligned pipes.

8. A connection between a pair of axially aligned corrugated pipes, each pipe having an outer wall having parallel, alternate ridges and grooves, said connection comprising:

a solid joint molded integrally over an end portion of said each pipe such that said joint is adhered to an entire outer surface of a portion of the alternate ridges and grooves with no gap being formed between said joint and said outer surface, said joint comprising a polymerized and solidified room-temperature quick polymerization-type reaction solution, and having a first cylindrical portion which has a first predetermined length from the end of said pipe in the axial direction of said pipe and a second cylindrical portion which is elongated axially outwardly from said first cylindrical portion to a second predetermined length, said second cylindrical portion surrounding said end portion of said pipe completely; and locking means formed on said second cylindrical portion of each joint;

wherein said reaction solution is prepared by mixing a polymerization catalyst and an activator with a norbornene-type monomer selected from a group consisting of dicyclopentadiene, tetracyclododecene and tricyclo-pentadiene, said polymerization catalyst being selected from a group consisting of organic ammonium salts and a halogenide of tungsten, molybdenum or tantalum, and said activator being selected from a group consisting of alkyl aluminum halide and organic tin compound;

wherein said locking means include:
an annular flange which is formed on an entire outer circumferential surface of each said second cylindrical portion and which extends radially outwardly from the outer end of said each second cylindrical portion, and means for fastening the annular flanges to each other to provide a connection between the aligned pipes.

9. A connection between a pair of axially aligned corrugated pipes, each pipe having an outer wall having parallel, alternate ridges and grooves, said connection comprising:

a solid joint molded integrally over an end portion of said each pipe such that said joint is adhered to an entire outer surface of a portion of the alternate ridges and grooves with no gap being formed between said joint and said outer surface, said joint comprising a polymerized and solidified room-temperature quick polymerization-type reaction solution, and having a first cylindrical portion which has a first predetermined length from the end of said pipe in the axial direction of said pipe, said first cylindrical portion surrounding said end portion of said pipe completely; and locking means formed on said first cylindrical portion of each joint;

wherein said reaction solution is prepared by mixing a polymerization catalyst and an activator with a norbornene-type monomer selected from a group consisting of dicyclopentadiene, tetracyclododecene and tricyclo-pentadiene, and wherein said reaction solution is poured;

wherein said locking means include:
an annular flange which is formed on an entire outer circumferential surface of each said first cylindrical portion and which extends radially outwardly from the outer end of said each first cylindrical portion, and means for fastening the annular flanges to each other to provide a connection between the aligned pipes.

10. A connection between a pair of axially aligned corrugated pipes, each pipe having an outer wall having parallel, alternate ridges and grooves, said connection comprising:

a solid joint molded integrally over an end portion of said each pipe such that said joint is adhered to an entire outer surface of a portion of the alternate ridges and grooves with no gap being formed between said joint and said outer surface, said joint comprising a polymerized and solidified room-temperature quick polymerization-type reaction solution, and having a first cylindrical portion which has a first predetermined length from the end of said pipe in the axial direction of said pipe and a second cylindrical portion which is elongated axially outwardly from said first cylindrical portion to a second predetermined length, said second cylindrical portion surrounding said end portion of said pipe completely; and locking means formed on said second cylindrical portion of each joint;

wherein said reaction solution is prepared by mixing a polymerization catalyst and an activator with a norbornene-type monomer selected from a group consisting of dicyclopentadiene, tetracyclododecene and tricyclo-pentadiene, and wherein said reaction solution is poured;

wherein said locking means include:

an annular flange which is formed on an entire outer circumferential surface of each said second cylindrical portion and which extends radially outwardly from the outer end of said each second cylindrical portion, and means for fastening the annular flanges to each other to provide a connection between the aligned pipes.

* * * * *

UNITED STATES PATENT AND TRADEMARK OFFICE
CERTIFICATE OF CORRECTION

PATENT NO. :    5,429,397
DATED      :    July 4, 1995
INVENTOR(S) :   Shiro KANAO It is certified that error appears in the above-identified patent and that said Letters Patent is hereby corrected as shown below:

Column 8, line 25, after "solution is", insert --poured--.

Signed and Sealed this

Twenty-sixth Day of November 1996

BRUCE LEHMAN

Attest:

Attesting Officer        Commissioner of Patents and Trademarks